United States Patent [19]

McCourt et al.

[11] Patent Number: 4,829,472

[45] Date of Patent: May 9, 1989

[54] SPELLING CHECK MODULE

[75] Inventors: Michael A. McCourt, Fairport; Kenneth J. Henderson, Pittsford, both of N.Y.

[73] Assignee: Microlytics, Inc., Pittsford, N.Y.

[21] Appl. No.: 921,215

[22] Filed: Oct. 20, 1986

[51] Int. Cl.⁴ ........................... G06F 3/02; G06F 7/02

[52] U.S. Cl. ..................................... 364/900; 364/419; 400/63

[58] Field of Search ........ 364/419, 518, 200 MS File, 364/900 MS File; 382/40, 57; 400/63, 74, 83, 98, 102, 110

[56] References Cited

U.S. PATENT DOCUMENTS

| | | | |
|---|---|---|---|
| 3,259,883 | 7/1966 | Robisaw et al. | 364/900 |
| 3,312,946 | 4/1967 | Craft et al. | 364/419 |
| 3,568,156 | 3/1971 | Thompson | 364/200 |
| 3,704,345 | 11/1972 | Cocker | 381/44 |
| 3,969,698 | 7/1976 | Bellinger et al. | 382/40 |
| 3,995,254 | 11/1976 | Rosenbaum | 382/57 |
| 4,010,445 | 5/1987 | Hoshino | 382/57 |
| 4,068,301 | 1/1978 | Ishino et al. | 364/200 |
| 4,092,729 | 5/1978 | Rosenbaum et al. | 364/900 |
| 4,136,395 | 1/1979 | Kolpek et al. | 364/518 |
| 4,145,739 | 3/1979 | Dunning et al. | 364/200 |
| 4,158,236 | 6/1979 | Levy | 364/900 |
| 4,181,813 | 1/1980 | Marley | 381/44 |
| 4,218,760 | 8/1980 | Levy | 364/900 |
| 4,270,182 | 5/1984 | Asija | 364/900 |
| 4,284,846 | 8/1981 | Marley | 381/45 |
| 4,290,105 | 9/1981 | Cichelli et al. | 364/200 |
| 4,328,561 | 5/1982 | Canvis et al. | 364/900 |
| 4,342,085 | 7/1982 | Glickman et al. | 364/300 |
| 4,355,302 | 10/1982 | Aldefeld et al | 382/40 |
| 4,355,370 | 10/1982 | Yanagiuchi | 364/900 |
| 4,355,371 | 10/1982 | Canvis et al. | 364/900 |
| 4,367,537 | 1/1983 | Yoshida | 364/900 |
| 4,381,551 | 4/1983 | Kanou et al. | 364/900 |
| 4,383,307 | 5/1983 | Gibson, III | 364/900 |
| 4,400,828 | 8/1983 | Pirzie et al. | 382/30 |
| 4,408,918 | 10/1983 | Smith | 400/697.1 |
| 4,410,957 | 10/1983 | Cosan et al. | 364/900 |
| 4,456,969 | 6/1984 | Herzik et al. | 364/900 |
| 4,456,973 | 6/1984 | Carlgren et al. | 364/900 |
| 4,459,678 | 7/1984 | McCoskill et al. | 364/900 |
| 4,471,459 | 9/1984 | Dickinson et al. | 364/900 |
| 4,481,607 | 11/1984 | Kobayashill et al. | 364/900 |
| 4,482,981 | 11/1984 | Morimoto et al. | 364/900 |
| 4,498,148 | 2/1984 | Glickman | 364/900 |
| 4,499,554 | 2/1985 | Kobayashi | 364/900 |
| 4,503,514 | 3/1985 | Urguhart | 364/900 |
| 4,580,241 | 4/1986 | Kucera | 364/900 |
| 4,582,441 | 4/1986 | Carter et al. | 400/63 |
| 4,590,560 | 5/1986 | Sado | 364/419 |
| 4,638,306 | 1/1987 | Rollhaus et al. | 400/100 |
| 4,651,300 | 3/1987 | Suzuki et al. | 364/900 |
| 4,654,818 | 3/1987 | Wetterau, Jr. | 364/900 |
| 4,655,620 | 4/1987 | Adams et al. | 400/63 |
| 4,671,684 | 6/1987 | Kojima et al. | 400/63 |
| 4,674,065 | 6/1987 | Lange et al. | 364/900 |
| 4,689,768 | 8/1987 | Heard et al. | 364/900 |
| 4,694,280 | 9/1987 | Rollhaus et al. | 400/100 |

FOREIGN PATENT DOCUMENTS 84307349.5 6/1985 European Pat. Off. .
2062916A 5/1981 United Kingdom .

OTHER PUBLICATIONS

BYTE–May, 1980, pp. 196–200, Munnecke.
Journal of the Association for Computing Machinery–-Jan. 1974, Wagner et al., vol. 21, #1, pp. 168-173.
IBM Technical Disclosure Bulletin, vol. 21, #9, pp. 3796-3797, Abbreviated Typing for Word Processing, Feb. 1979-Todd.

Primary Examiner—Gareth D. Shaw
Assistant Examiner—Joseph T. Fitzgerald
Attorney, Agent, or Firm—Lipton, Famiglio & Elman

[57] ABSTRACT

A spelling check module for use in conjunction with an electronic typewriter or personal computer of the type which has a keyboard and a data processor interconnected by a respective keyboard connector and a data processor connector, includes male and female connectors which are arranged to receive the keyboard connector and data processor connectors. The spelling check module is installed by disconnecting the keyboard connector from the data processor connector and interposing the spelling check module therebetween by connecting the keyboard connector and the data processor connector to the respective connectors of the spelling check module. The spelling check module is controlled by selected non-printing, non-control keys, and also includes a personal dictionary to which dictionary words can be added by the user to customize the spelling check module to a specific application.

15 Claims, 11 Drawing Sheets

FLEXIBLE ENVIRONMENT KEYS

| COMMAND | MODE | ACTION |
|---|---|---|
| ⟨CTRL⟩ 0 | | ON / OFF |
| ⟨CTRL⟩ 1 | | ADD WORD |
| ⟨CTRL⟩ 2 | | REMOVE WORD |
| ⟨CTRL⟩ 4 | A | PRESET FOR WORDSTAR 1 |
| ⟨CTRL⟩ 5 | B | PRESET FOR WORD PERFECT / DISPLAY WRITE |
| ⟨CTRL⟩ 6 | C | PRESET FOR MICROSOFT WORD |
| ⟨CTRL⟩ 7 | D | PRESET FOR MULTIMATE |
| ⟨CTRL⟩ 8 | E | PRESET FOR SIDEKICK / WORDSTAR 2 |
| ⟨CTRL⟩ 9 | F | PRESET FOR WORDSTAR 2000 |

FIG. 13

CHANGE COMMAND KEYS

| COMMAND | ACTION |
|---|---|
| chgoff @ | CHANGE ON/OFF COMMAND |
| chgadd @ | CHANGE ADD WORD COMMAND |
| chgrem @ | CHANGE REMOVE WORD COMMAND |
| chgrgt @ | CHANGE CURSOR RIGHT KEY |
| chglft @ | CHANGE CURSOR LEFT KEY |
| chgdel @ | CHANGE DELETE CHARACTER KEY |
| chgbsp @ | CHANGE BACKSPACE KEY |
| chgin 1 @ | CHANGE INSERT ON KEY |
| chgin 2 @ | CHANGE INSERT OFF KEY |
| chgmox @ | CHANGE MODE CONTROL FOR X MODE |
| chgres @ | RESET TO DEFAULT SETTING |

FIG. 14

SPELLING CHECK MODULE

FIELD OF THE INVENTION

This invention relates to a spelling check apparatus for use in conjunction with an electronic typewriter or personal computer.

Spelling check techniques are well known. For example, see U.S. Pat. No. 4,136,395; U.S. Pat. No. 3,995,254; U.S. Pat. No. 4,498,148; U.S. Pat. No. 4,355,302; U.S. Pat. No. 4,400,828; U.S. Pat. No. 4,010,445 and U.S. Pat. No. 4,383,307, which relate to the general problem of checking the spelling of the words in a document which is stored in electronic form as a series of digital codes representing characters and keystrokes. Also see U.S. Pat. No. 4,580,241; U.S. Pat. No. 4,503,514; U.S. Pat. No. 4,342,085; U.S. Pat. No. 4,355,371 and U.S. Pat. No. 4,328,561, as well as the publications "The Use Of Trigram Analysis For Spelling Error Detection" published in Information and Processing Management, Vol. 17 No. 6, pages 305-316, 1981 by Pergamon Press Limited, Great Britain; "Collection And Characterization Of Spelling Errors In Scientific And Scholarly Text" published in The Journal of the American Society for Information Science 34(1): 51-58; 1983 by John Wiley and Sons, Inc. and "Automatic Spelling Error Detection And Correction In Textual Data Bases" published in Information Interaction; Proceedings of the 45th ASIS Annual meeting, Vol. 19, 1982, which describe various techniques for compressing the stored dictionary data of correctly spelled words so as to reduce the size of the memory required to store the dictionary, and also describe a variety of techniques for reducing the time required to search for a word in the dictionary in order to perform a spelling check, thereby improving the system speed.

Known spelling check techniques are typically suitable for use in a computer, such as a personal computer (PC) where memory space and computing power is available. In such case, the spelling checker consists of an additional application control program plus a stored dictionary of correctly spelled words which can be used in conjunction with a word processing program without adding any hardware overhead to the personal computer. However, an addition program is required which increases memory usage and slows down the operation of the resident word processing program when used with a real time spelling check application program. In contrast, an electronic typewriter, which may have some features such as limited text memory and document editing, typically does not have either a general purpose computer nor the additional memory space to support a spelling check application program.

Therefore, in order to spell check a document in an electronic typewriter, it is necessary to include specifically dedicated hardware and software. For example, see European Patent Application Publication No. EP 0097818 A2 which describes a typewriter incorporating special hardware and software to provide a spelling check feature. However, many electronic typewriters do not have a spelling check capability incorporated as part of the original design. The present invention is directed towards a means for adding spelling check capability to an electronic typewriter or PC word processing application without substantial modification.

SUMMARY OF THE INVENTION

The present invention is embodied in a spelling check module which can be installed in any electronic typewriter or PC of the type which has a keyboard and a data processor interconnected by a respective keyboard connector and a data processor connector. The spelling check module of the present invention includes male and female connectors which are arranged to receive the keyboard connector and data processor connectors. The spelling check module is installed by disconnecting the keyboard connector from the data processor connector and interposing the spelling check module therebetween by connecting the keyboard connector and the data processor connector to the mating connectors of the spelling check module. Therefore, an electronic typewriter which otherwise has no provision in its original design to include a spelling check feature, can be easily upgraded by the user to include such feature without substantial modification to the original unit.

Furthermore, in the case where a PC is used as a word processor, text entry device, electronic mail or telex terminal, or for any other application where the entry of known words and phrases is incorporated, and the keyboard is separate and detachable from the data processor (such as in the IBM PC), the spelling check module can be externally installed in the circuit between the keyboard and the data processor. Thus, the user can easily upgrade the PC to include a real time spelling check feature without any additional programs or memory usage and without any modification to the keyboard or the data processor unit.

In accordance with one aspect of the present invention, the spelling check module has a plurality of pass-through signal paths between the male and female connectors thereof which passes through the original signals to and from the keyboard and data processor to assure a normal operation of the PC or electronic typewriter. However the spelling check module also senses the digital codes representing keystrokes from the keyboard being transmitted to the data processor in order to detect spelling errors. After the entry of a typed word is detected, the spelling check module checks the spelling of the word against a main dictionary storage in memory, and beeps twice if the typed word is determined to be misspelled.

In accordance with another aspect of the present invention, the spelling check module responds to non-printing and non-control keystrokes from the keyboard in order to switch the spelling check module on and off, and to add and delete words from a personal dictionary. In such manner, the spelling check module can be controlled without interfering with the normal operation of the typewriter.

In accordance with yet another aspect of the present invention, the spelling check module includes a personal dictionary to which dictionary words can be added by the user to customize the spelling check module to the application.

DESCRIPTION OF THE DRAWINGS

FIG. 13 is a table of flexible environment keys used to program control keys for a spelling check module in accordance with the present invention for use with a personal computer.

FIG. 14 is a table of change command codes to alter the control keys of a spelling check module in accordance with the present invention for use with a personal computer.

DETAILED DESCRIPTION

Figure 1:
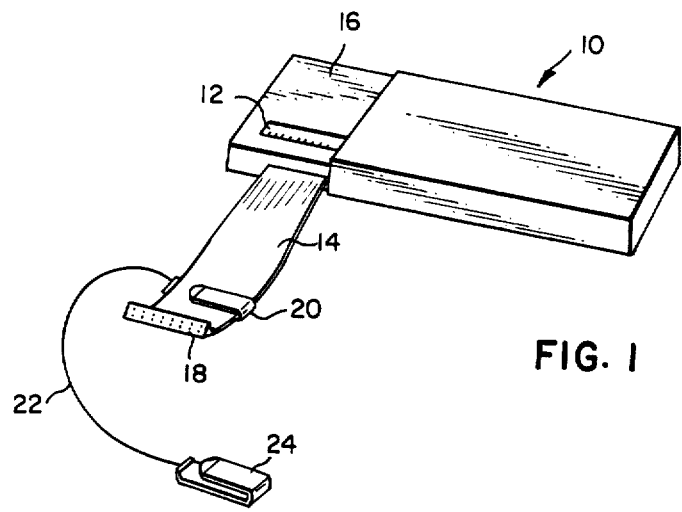
FIG. 1 is an isometric view of a spelling check module in accordance with the present invention.

The spelling check module 10 in FIG. 1 comprises a housing 16, a first connector 12, a second connector 18 which is connected by cable 14 to the spelling check module through an opening in the housing 16. A grounding cable assembly includes a first grounding clip 20 connected to a second grounding clip 24 through a conductor 22.

Figure 2:
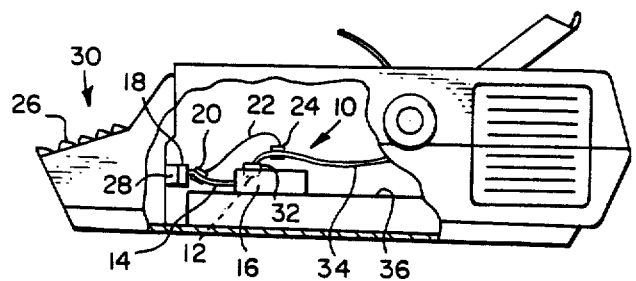
FIG. 2 is a cross sectional view of an electronic typewriter including a spelling check module installed in accordance with the present invention.

FIG. 2 shows the spelling check module 10 installed in an electronic typewriter 30. The electronic typewriter 30 includes a data processing section 36 having a cable 34 terminated by a data processor connector 32. The electronic typewriter 30 also includes a keyboard 26 having a keyboard connector 28 for transmitting keystroke data and bi-directional control signals. Prior to the installation of the spelling check module of the present invention, the data processor connector 32 is mated with the keyboard connector 28 for normal operation. Keystrokes generated at keyboard 26 are transmitted as digital codes through connector 28 to connector 32 along cable 34 to the data processor electronics 36.

To install the spelling check module 10, connector 32 is disengaged from connector 28. The housing 16 is placed inside the electronic typewriter 30, connector 32 is mated with connector 12, connector 18 is mated with connector 28, and the grounding clip assembly 20, 22 and 24 is placed so as to engage cable 14 and cable 34. Thus installed, the spelling check module of the present invention will enable an ordinary electronic typewriter to check the spelling of the words as they are typed.

Figure 3:
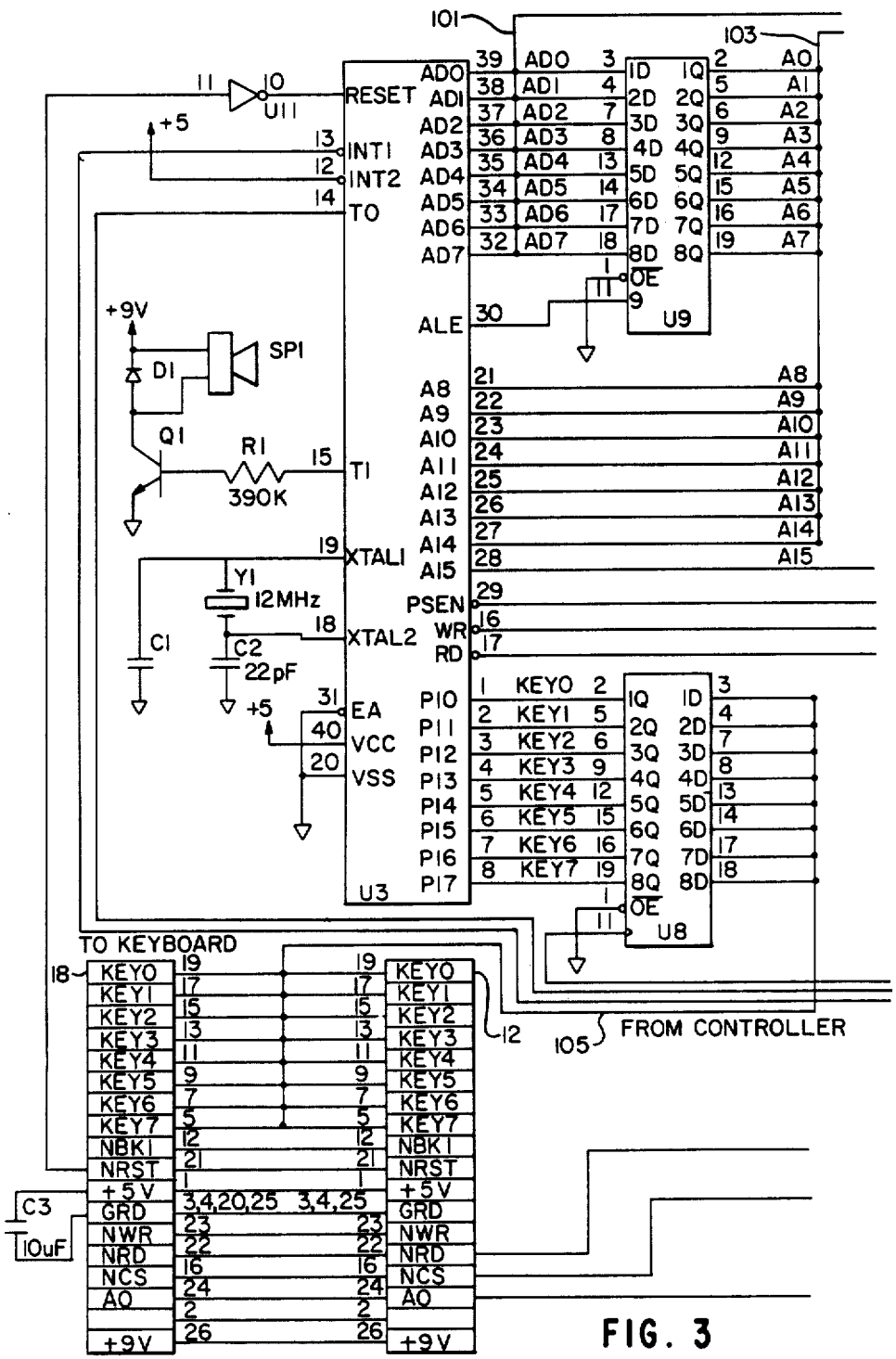
FIGS. 3 and 4 are a schematic diagram of a spelling check module in accordance with the present invention.
Figure 4:
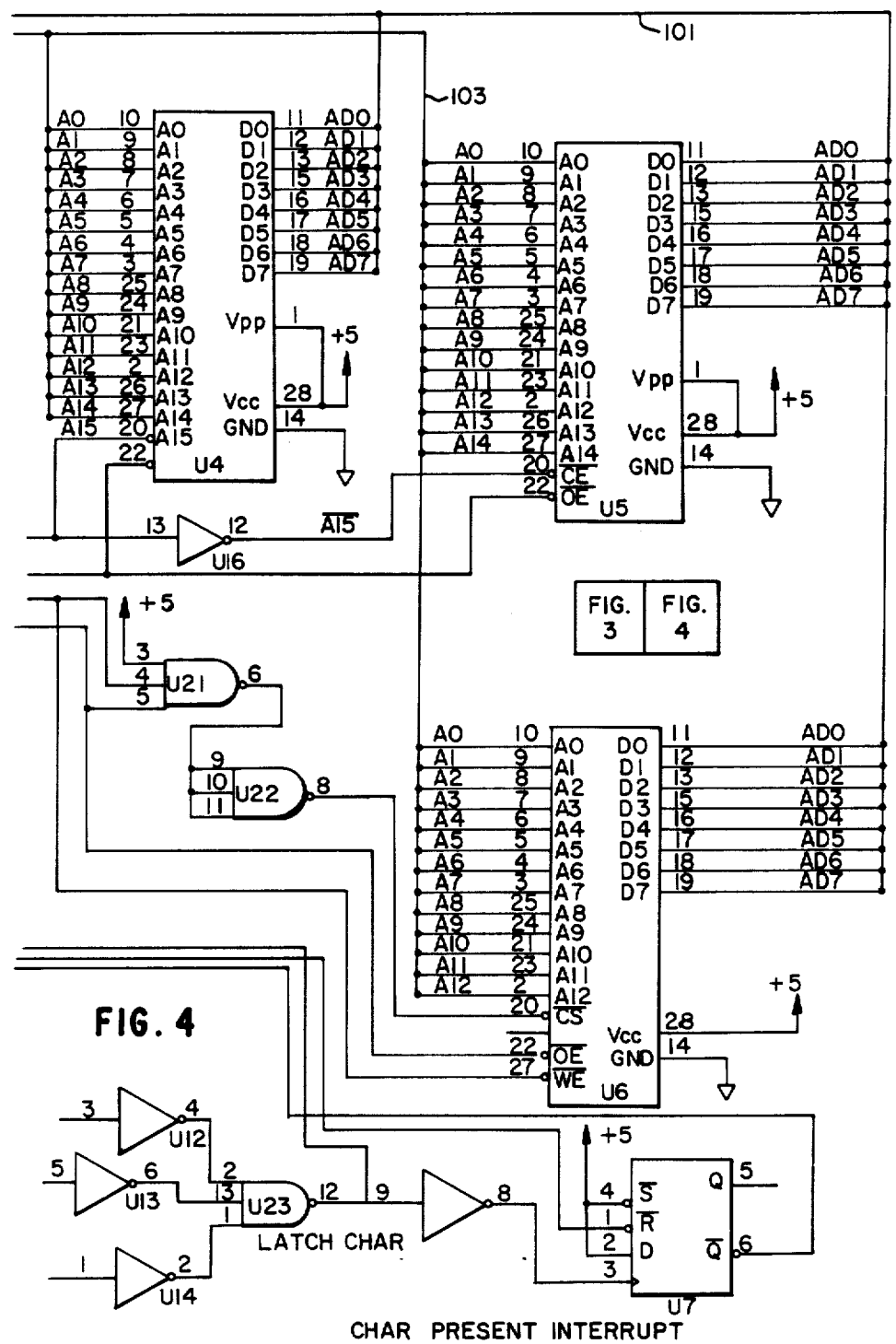

A schematic diagram of the circuitry of the spelling check module is shown in FIGS. 3 and 4. Each integrated circuit is shown with external pin numbers for each conductor adjacent to the functional designation for such conductor. The microprocessor U3 is a one-chip microcontroller such as the type 8031 microprocessor available from Intel Corporation, Santa Clara, Calif. The microprocessor U3 is connected by suitable address and data busses to a read-only memory (ROM) comprising integrated circuits U4 and U5, each of which stores 256K bits of compressed dictionary storage and the control program. Integrated circuits U4 and U5 may be type 27256 available from Intel Corporation. Also connected to the system address and data busses is a 64K-bit CMOS random-access memory (RAM) U6, such as type UPD4464 which is provided to store entries into the personal dictionary of the spelling check module. A battery backup (not shown) is provided to RAM U6 to prevent loss of personal dictionary storage when power is removed from the spelling check module. An 8-bit data latch U8 is provided to hold the digital code representing the current typed keystroke. A second 8-bit data latch U9 is used to hold the lower 8 bits of the memory system address. Integrated circuit U9 may be type 74HCT373 integrated circuits; U8 may be type 74HCT374.

A bi-directional 8-bit data bus 101 connects the 8 individual data bits, AD0 through AD7, between microprocessor U3 and corresponding data bits from the ROM memory U4, U5, to and from the RAM memory U6, and to the address latch U9. Also, a 16-bit address bus 103 interconnects the microprocessor U3 to the ROM U4, U5 and RAM U6 memories. Specifically, address bits A0 through A14 of latch U9 and microprocessor U3 are connected to corresponding pins A0 through A14 of ROM U4 and ROM U5. Address bit A15 which is generated on pin 28 of microprocessor U3, is connected to the CE input, pin 20 of U4, and the input to inverter U16. The output of inverter U16 is the inverted bit A15 and is connected to the CE input, pin 20 of ROM U5. Thus, the CE inputs function as the highest order address bit to select the upper or lower 256K bits of ROM memory.

The lower 8 bits of the address bus 103, AD0 through AD7, are the outputs 1Q through 8Q respectively from latch U9. The output O3 pin 1 of U9 is connected to ground potential. The eight-bit input, 1D through 7D of the latch U9 is the data bits AD0 through AD7 respectively of the data bus 101. The ALE signal on pin 30 of microprocessor U3 causes the data bits AD0 through AD7 from the data bus 101 to be stored in latch U9 as the lower 8 bits A0 through A7 to the address bus 103. The address bits A8 through A14 on address bus 103 are generated by microprocessor U3. The RAM memory U6 receives only the lower 13 bits A0 through A12 of the addresss bus 103 on corresponding address input pins.

Control of the microprocessor memory RAM U6 and ROM U4, U5 is provided by the RD, WR, and PSEN control lines on pins 17, 16 and 29, respectively of microprocessor U3. The PSEN signal is applied to the OE input (pin 22) of ROM U4 and ROM U5 which active state determines when a ROM memory access will occur. The PSEN control lines is not active when the RAM memory is being selected. In such event, one of the WR or RD lines is active depending upon whether the operation is a write or a read operation. NAND gate U21 and NAND gate U22 provide a CS signal to pin 20 of RAM U6 which selects the RAM whenever there is either a read or a write operation being performed. The WR and the RD control lines are also connected to the WE pin 27 and the OE pin 22, respectively of RAM 16 to select either a write or a read operation respectively.

As indicated above, the spelling check module of the present invention is inserted between the connector from the keyboard and the connector from the controller, or data processor, of the electronic typewriter. As can be seen in FIG. 3, a straight-through connection between input connector 18 from the keyboard and output connector 12 to the controller is made for each individual respective pin on such connectors. Each keystroke from the keyboard is represented by an 8-bit code on key 0 through key 7. An 8-bit bus 105 connects the key 0 through key 7 pins to the respective 8-bit data input 1D through 8D to latch U8. Three individual signals (A0, NCS, and NRD) on pin 24, 16 and 22 respectively of connectors 18 and 12 are used to indicate the presence of a valid keystroke character on the keystroke data bus 105. Pins 24, 16 and 22 of the connectors 18 and 12 are connected to the input of inverters U14, U13 and U12, respectively. The outputs of U14, U13, and U12 are connected to the respective inputs of a three input NAND gate U23. The output of U23 is connected to the data strobe input pin 11 of latch U8. The OE pin 1 of latch U5 is connected to ground potential. The output of U23 is further connected to the input of inverter U15, the output of inverter U15 is connected to the clock input of a flip-flop U7. The data input and the set input of flip-flop U7 are connected to the 5-volt supply. The inverted Q output of flip-flop U7 is connected to the interrupt line (INT 1) pin 13 of microprocessor U3. A second interrupt pin 12 is unused and is connected to the 5-volt supply. The reset input pin 1 of flip flop U7 is connected to an output of microprocessor U3 on pin 14. The system reset signal on pin 21 of connectors U18 and U12 is connected through inverter U1 to the reset input of microprocessor U3 on pin 9.

The power source for the spelling check module is provided by the power available on the connectors 18 and 12. Specifically, a 5-volt source is provided on pin 1, and a 9-volt source is provided on pin 26. A ground connection is provided on pins 3, 4, 20, and 25. A filter capacitor C3 for the 5-volt supply is connected between the 5-volt source and system ground. A 12 MHz crystal for system clock timing is provided between pins 18 and 19 of the microprocessor U3. Capacitors C1 and C2 are connected respectively between pins 19 and 18 of microprocessor U3 and system ground. A speaker SP1 is included for providing an audible beep to indicate the misspelling of a typed word. Output bit T1 on pin 15 of microprocessor U3 is connected through resistor R1 to the base electrode of transistor Q1. The emitter of transistor Q1 is connected to ground and the connector of transistor Q1 is connected to one terminal of speaker SP1, the other terminal of speaker SP1 being connected to the 9-volt power supply. A diode D1 is connected across the inductive coil of speaker SP1 to protect transistor Q1 from adverse overvoltage conditions.

In operation, keystrokes entered at the keyboard cause corresponding digital codes to appear on keystroke bus 105. At the same time, pins 24, 16 and 22 of connectors 18 and 12 will go low, providing all high inputs to NAND gate 23 from inverters U12, U13, and U14. The changing output of NAND gate U23 causes latch U5 to store the keystroke data, key 0 through key 7. The data output of latch U8, key 0 through key 7, is input to the microprocessor through input P10 through P17, on pins 1 through 8 respectively. Also, the output of inverter U15 causes a flip-flop U7 to go into a set condition. The Q output of flip-flop U7 provides an interrupt to microprocessor U3 on pin 13. After the keystroke data is read by the microprocessor U3, an acknowledge signal is provided on output pin 14 of microprocessor U3 to the R input of U7 which resets flip-flop U7. In such manner, the spelling check microprocessor U3 reads and acknowledges each keystroke provided between the keyboard connector 18 and the controller, or data processor connector 12 of the electronic typewriter. When a spelling error is detected, the microprocessor U3 provides an audio frequency signal on output T1 which is amplified in transistor Q1 and applied to speaker SP1 which provides an audible indication to the operator. Thus, spell checking errors in real time with audible feedback to the operator as each word is typed.

Figure 5:
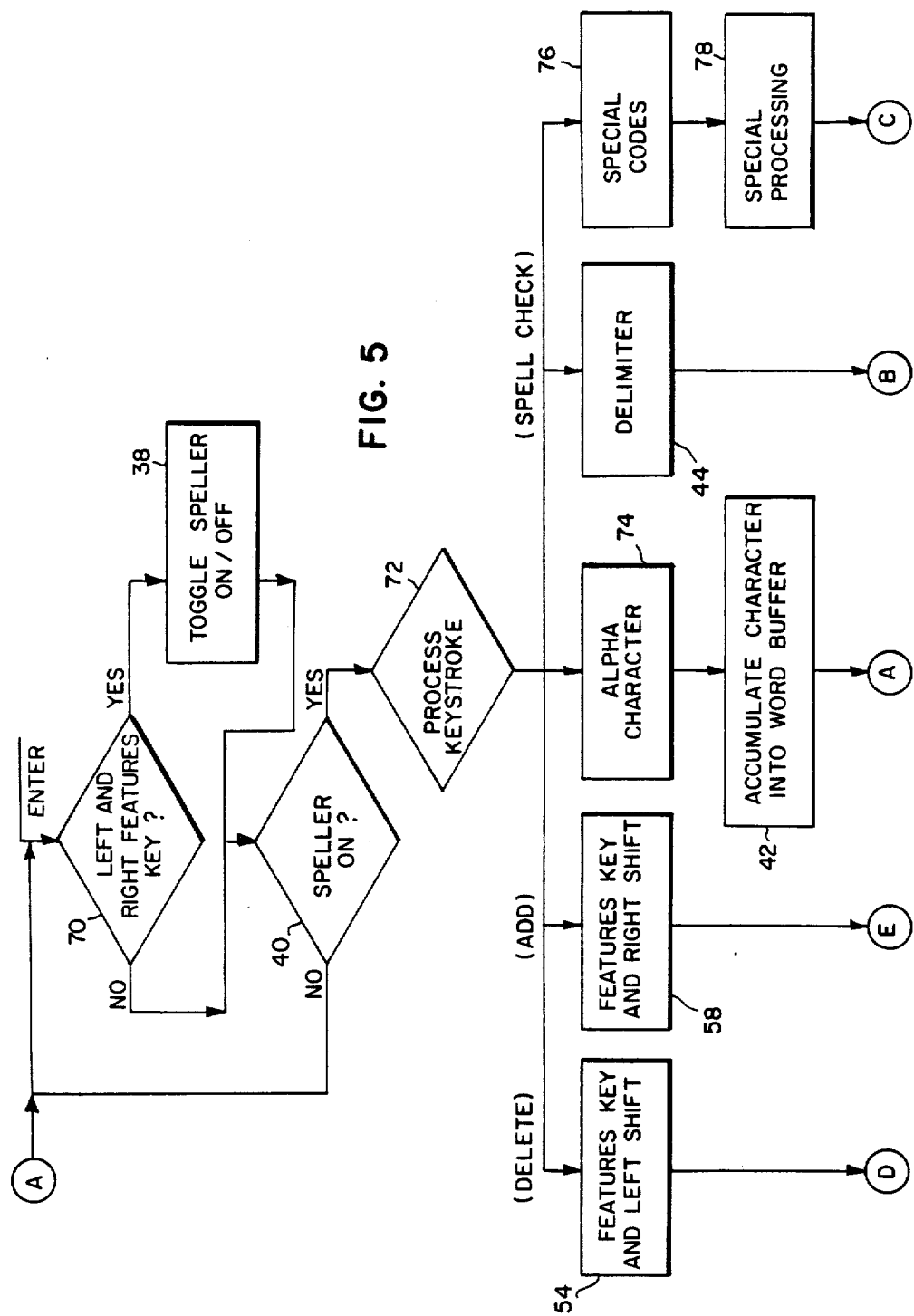
FIGS. 5 and 6 are a programming flow chart for the microprocessor U3 of FIG. 3 in accordance with the present invention.
Figure 6:
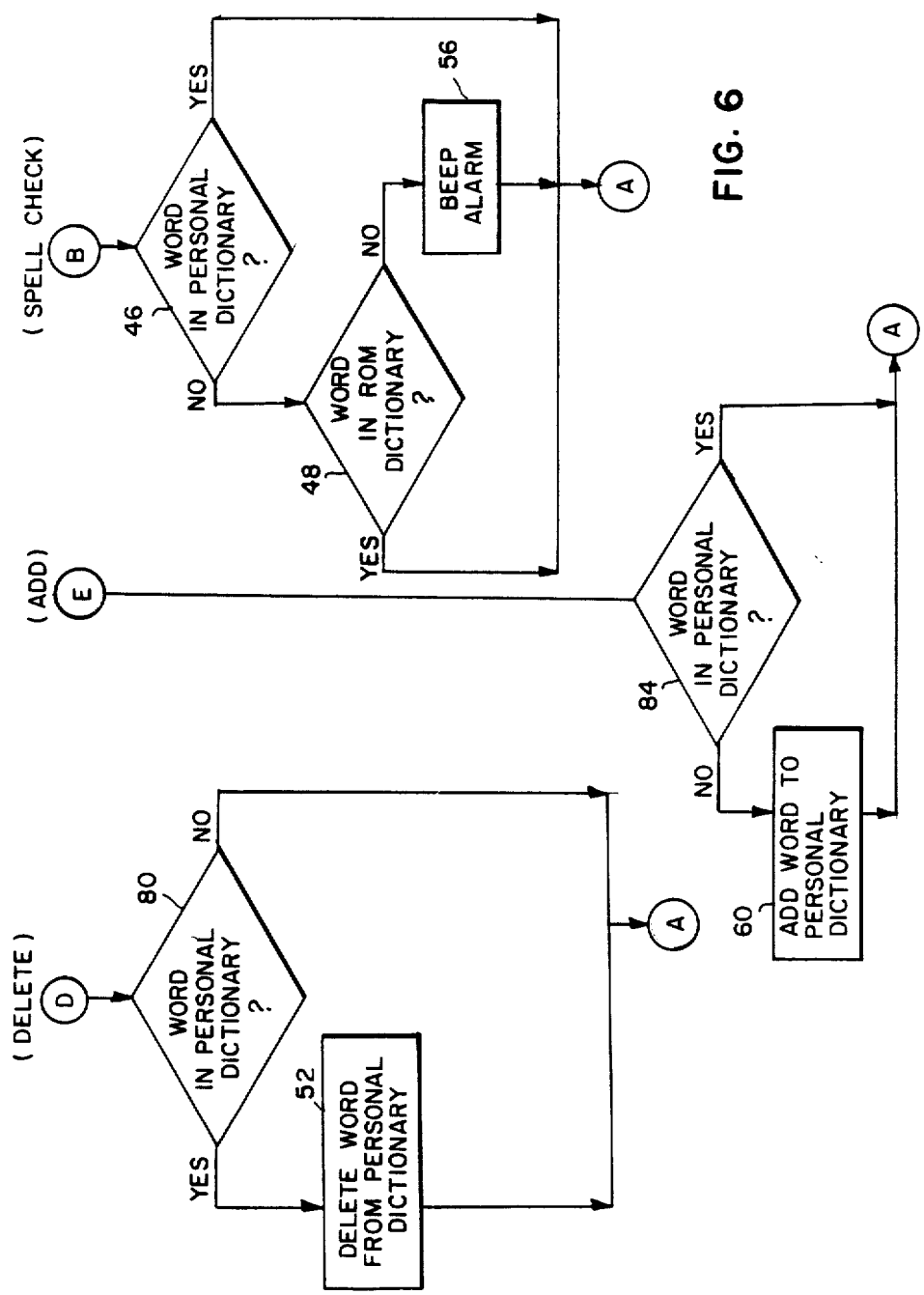

FIGS. 5 and 6 show a flow chart of the control program performed by the microprocessor U3. It is desirable to control the spelling check module, and at the same time not adversely effect the operation of the PC or electronic typewriter. For this purpose, the spelling check module recognizes certain combinations of non-printing, non-control keys. A non-printing, non-control key means a key which will not result in a printed character nor which will result in a control function of the typewriter being activated. For example, in the Xerox Memorywriter model 620, there are left and right features keys which may be used together and in combination with the left and right shift keys to control the spelling check module and not interfere with the normal operation of the typewriter.

Upon power up, the microprocessor enters the mode previously stored at last power off. If, as shown in FIG. 5, while holding down the left features key, the operator presses and releases the right features key at step 70, the system will toggle between on and off mode at step 38.

If the spell check module is in the on mode at step 40, the microprocessor then processes each successive keystroke at step 72. Alpha characters, i.e. the letters A through Z are detected at step 74 and accumulated in a word buffer, or register, at step 42. Also, a line buffer or register having a length equal to one type written line of type which is maintained in memory in order to permit back spacing to a previously typed word. Certain characters, such as auto repeat characters like the underline, and other special function keys such as tabs are ignored. The program re-enters at step 70 and checks the current mode at step 40 before processing the next keystroke at step 72.

The process continues until a word delimiter is encountered which indicates the entry of a completed word at step 44. In general, any printable non-alpha character such as a space, period, comma, quotation mark, asterisk, carriage return, etc., is a word delimiter and indicates the entry of a typed word. For example, any character other than A-Z, a-z, 0-9, /, \ , or ' may be deemed a delimiter. Various special conditions such as a hyphen followed by a character return indicates a continuation of a word to the next line. If certain special function keys such as "FIND" are pressed, the program does not spell check the resulting word. In general, techniques for identifying valid word delimiters in a written document are well known in the art. After a word delimiter has been detected in step 44, microprocessor U3 searches for the word in the personal dictionary storage of RAM U6 at step 46 (see FIG. 6). If the word is not found in the personal dictionary, the microprocessor searches for the word in the ROM dictionary at step 48. Techniques for searching for a word in a stored dictionary, as well as techniques for providing compressed dictionary storage are also well known in the art. If the typed word was not found in the personal dictionary or ROM dictionary at steps at steps 46 and 48, an audible indication in the form of two beeps is provided at step 56. A pair of beeps indicates to the operator that the word is misspelled. The operator can then backspace to the misspelled word and edit the word or overtype the correct word, during which time the spelling check module will spell check the corrected word as outlined above, by comparing the pointer position in the device buffer to the keystrokes of the operator, and looking for delimiter characters. Alternatively, the operator may add the word in question to the personal dictionary.

If the operator desires to add a word not already in the ROM dictionary or the personal dictionary, either features key and the right shift key is pressed at step 58, FIG. 5. Then, in FIG. 6, the program verifies that the word is not in the personal dictionary at step 84 and causes a new word in the form of correct spelling data to be added to the personal dictionary at step 60. If the word is already found in the personal dictionary at step 84, the program returns to the entry in FIG. 5.

If the operator desires to delete a word, either features key and the left shift key is pressed at step 54. Then, in FIG. 6, if the word is found in the personal dictionary at step 80, the word is deleted from the personal dictionary at step 52. If the word was not found in the personal dictionary at step 80, no action is necessary, and the program returns to the entry in FIG. 5.

Special codes are detected at step 76 and given special processing at step 78. For example, in the Xerox Memorywriter, if special codes for turning on communications are detected at step 76, then the spelling check module is turned off at step 78 so as not to confuse the operator by spell checking a communication sign on sequence. Similarly, by detecting the command for a macro at step 76, undesired beeping when a non-word is created as a macro, is avoided. Thus, by tailoring the special processing steps 76, 78, to the specific system environment, the spell check module can be tailored to optimally co-reside with the host.

It therefore can be seen that a spelling check feature has been added to an electronic typewriter in accordance with the present invention simply by interposing a spelling check module between the keyboard connector and the data processor connector of an electronic typewriter.

Figure 7:
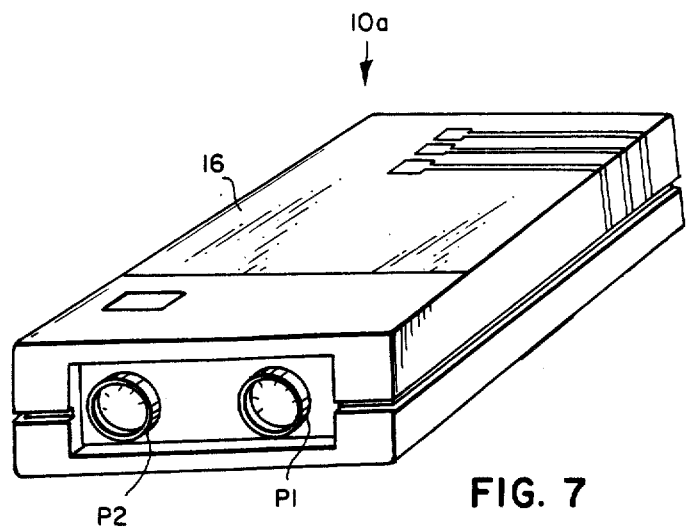
FIG. 7 is an isometric view of a spelling check module in accordance with the present invention for use in conjunction with a personal computer.

A spelling check module 10a suitable for use in conjunction with a PC is shown in FIG. 7 and comprises a housing 16, a first connector P1, and a second connector P2.

Figure 8:
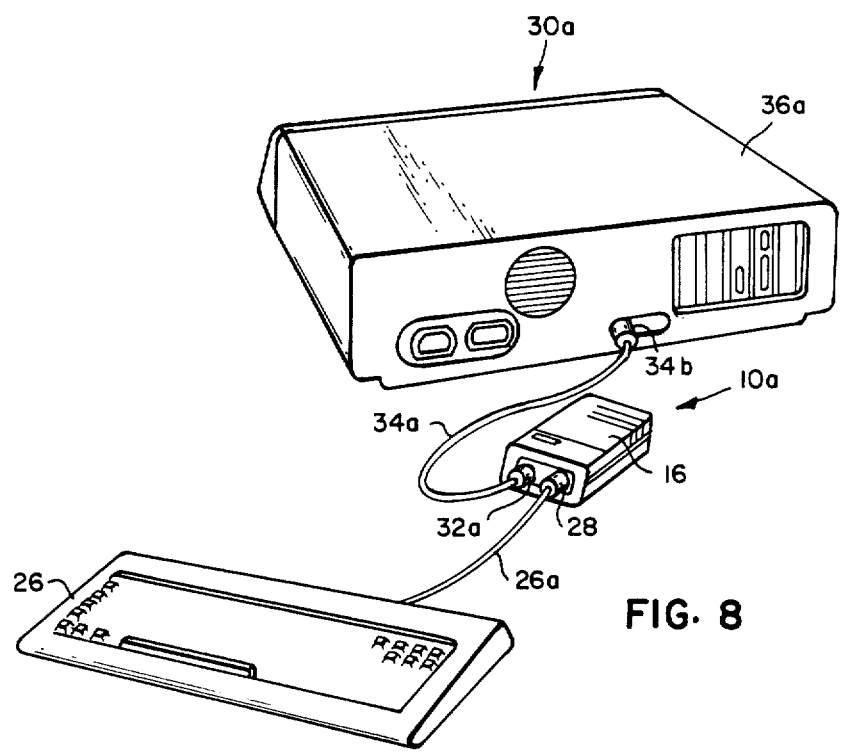
FIG. 8 is an isometric view of a personal computer including a spelling check module installed in accordance with the present invention.
Figure 9:
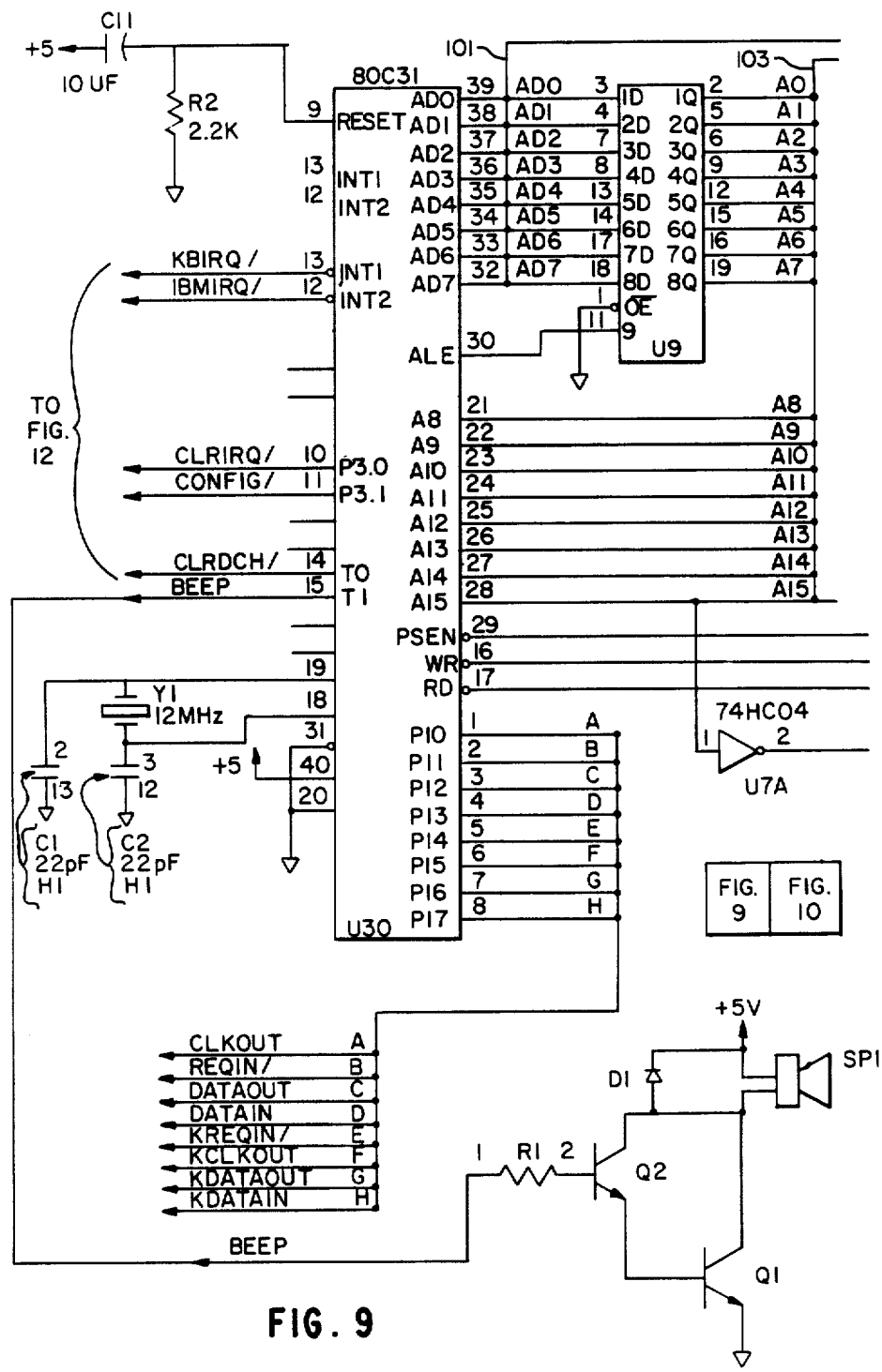
FIGS. 9, 10, 11 and 12 are a schematic diagram of a spelling check module for use in conjunction with a personal computer in accordance with the present invention.
Figure 10:
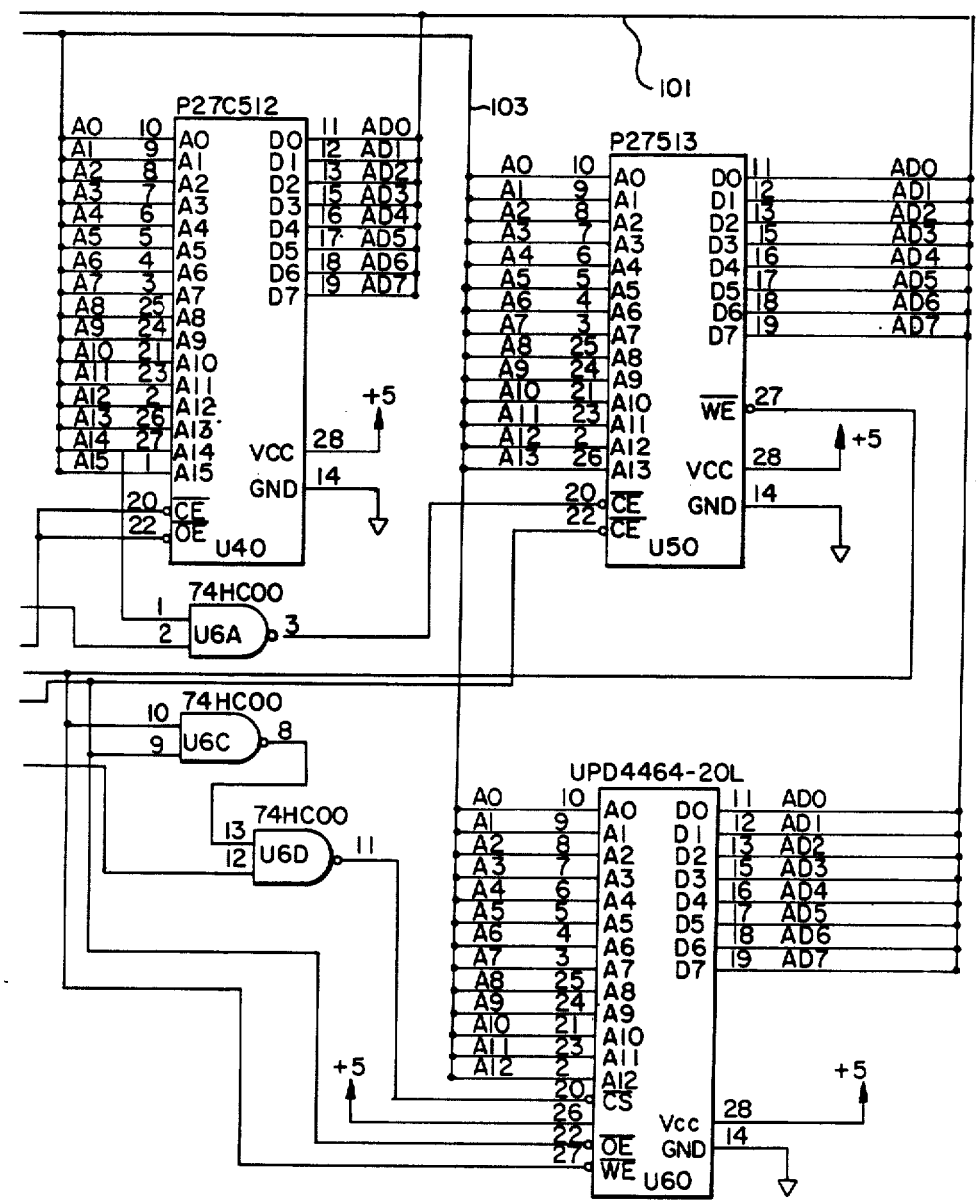
Figure 11:
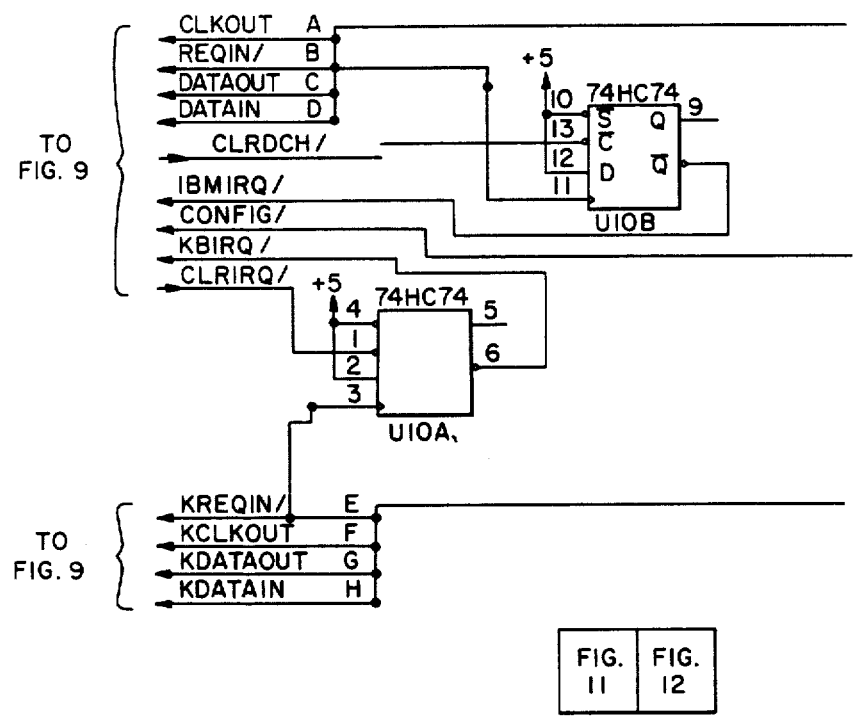

FIG. 8 shows the spelling check module 10a installed in a PC configuration 30a. The PC 30a includes a data processing section 36a. The PC 30a also includes a keyboard 26 having a keyboard cable 26a terminated by a keyboard connector 28 for transmitting keystroke data and bidirectional control signals. Prior to the installation of the spelling check module of the present invention, the data processor section 36a is mated with connector 28 for normal operation. Keystrokes generated at keyboard 26 are transmitted as digital codes through keyboard cable 26a and connector 28 to the data processor electronics 36a.

To install the spelling check module 10a, connector 28 is disengaged from the data processor section 36a and connected to connector P1 of the spelling check module 10a. An additional cable, 34a, connects the connector P2 of the spelling check module 10a through connector 34b to the data processing section 36a. Thus installed, the spelling check module 10a will enable a PC in conjunction with an ordinary word processing program to check the spelling of words as they are typed.

A schematic diagram of the circuitry of the spelling check module 10a is shown in FIGS. 9, 10, 11 and 12. The microprocessor U30 is a one chip microcontroller such as the type 80C31. The microprocessor U30 is connected by a suitable address and data bus (103 and 101 respectively) to a read-only memory space comprising a 512K-bit ROM, U40, and a 64K-bit paging EPROM, U50. ROM U40 may be a type 27C512 integrated circuit, and EPROM U50 may be a type 27513 integrated circuit, both available from Intel Semiconductor Corporation. Also, as in the spelling check module for an electronic typewriter, a 64K-bit memory U6, and address control logic comprising inverter U7A NAND gates U6A, U6C, and U6D, select the appropriate portion of the memory space based on address bit A15, pin 28 of U30 and the PSEN, WR, and RD control lines on pin 29, 16, and 17 respectively of microprocessor U30. The reset input, pin 9, of microprocessor U30 is connected through resistor R2 to ground and through capacitor C11 to +5 Volts, assuring a reset state of the microprocessor upon power up. The audible signal output on pin 15 of microprocessor U30 is provided through resistor R1 to a Darlington connected pair of transistors Q1, Q2 to drive speaker SP1.

The operation of the microprocessor and the control memory, ROM dictionary, and personal dictionary memory, is similar to that described for the spelling check module for the electronic typewriter. However, while the data in the spelling check module for the electronic typewriter is transmitted in bit parallel form, in the version for the PC, the data is transmitted in bit serial form. Accordingly, the microprocessor receives data one bit at a time to acquire the successive keystroke codes.

Figure 12:
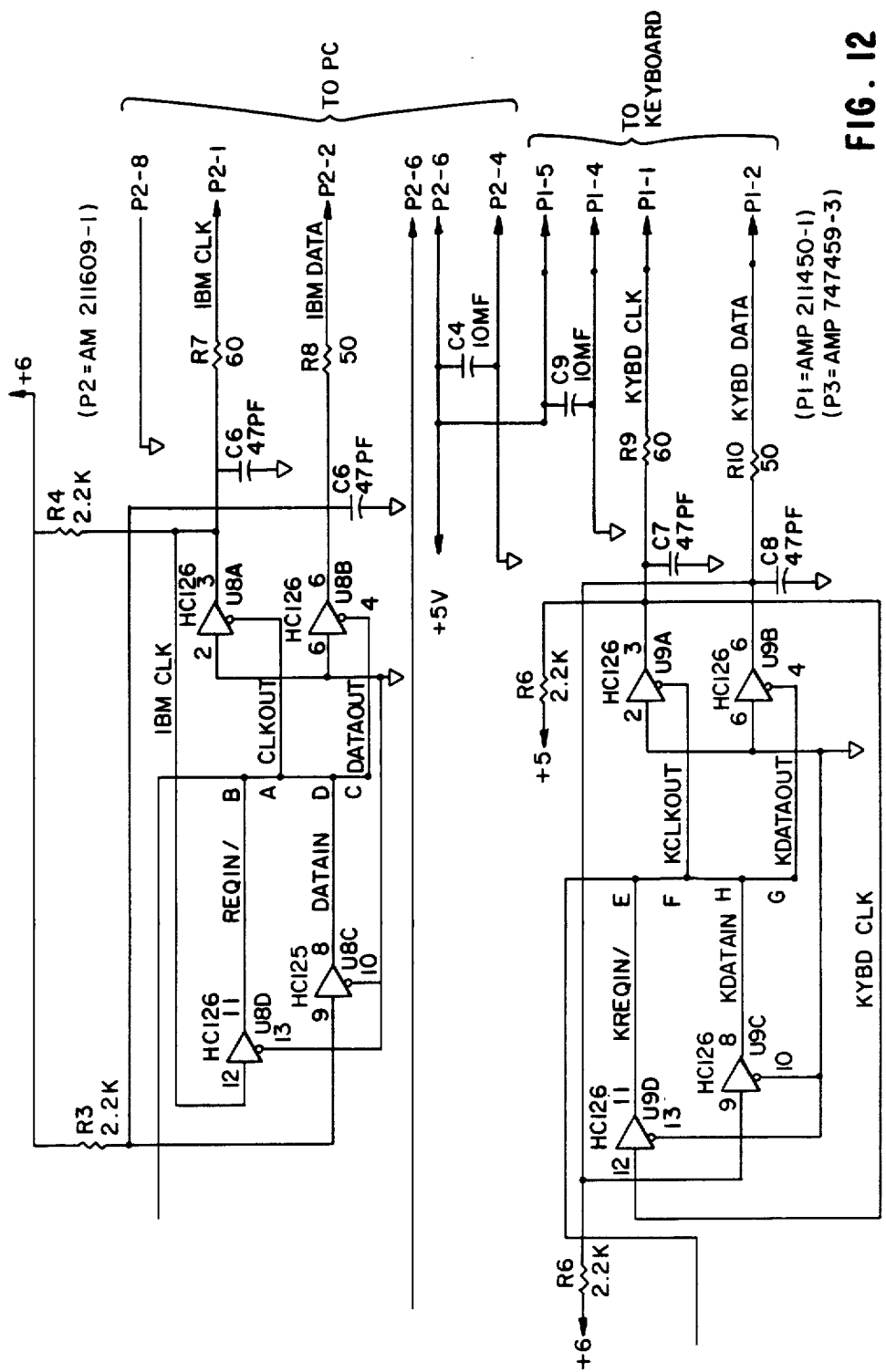

As shown in FIG. 12, connector P1 receives a keyboard clock (KYBD CLK) on pin 1 thereof, a keyboard data signal (KYB DATA) on pin 2 thereof, and 5 Volts and ground on pins 5 and 4 respectively. The KYB DCLK and KYBD DATA signals are bidirectional and are both input and output to the microprocessor U30. Tri-state buffers U9A, U9B, U9C, and U9D are arranged to provide bidirectional data transfer for the keyboard data out (KDATAOUT), and the keyboard data in (KDATAIN), as well as the keyboard clock out (KCLKOUT) and the keyboard request in (KREQIN) to and from the microprocessor U30 on pins 7, 8, 6, and 5 respectively. Pullup resistors R5 and R6 are connected to the KYBD DATA and KYBD CLK output lines to the keyboard respectively.

Note that the connector P1 to the keyboard is not directly connected to connector P2 to the PC. Accordingly, the microprocessor U30 must transfer data to and from the keyboard and between the PC in order to assure normal operation of the PC and its word processing program.

Connector P2 in FIG. 12 provides a PC clock signal (IBM CLK) on pin 1 thereof, a data signal (IBM DATA) on pin 2 thereof, and 5 Volts in ground on pins 5 and 4 respectively. Also, on pin 6 thereof is a configuration signal which discriminates between an XT or an AT configuration of an IBM PC or compatible personal computer.

The IBM CLK signals and IBM DATA signals are also bidirectional signals to and from the PC. Tri-state inverters U8A, U8B, U8C and U8D provide for bidirectional data transfer between the microprocessor U30 and the IBM CLK signal and the IBM DATA signal. Specifically, the clock out (CLKOUT) and data out (DATAOUT), request in (REQIN) and data in (DATAIN) are provided on pins 1, 3, 2, and 4 microprocessor U30 respectively. Pull-up resistors R3 and R4 are connected to the IBM DATA and IBM CLK lines at the output of tri-state inverters U8B and U8A respectively.

Two interrupt requests, a keyboard interrupt (KBIRQ) and a PC interrupt (IBMIRQ) are provided on interrupt pins 13 and 12 respectively of microprocessor U30. The KBIRQ and IBMIRQ signals are generated by flip-flop U10A and U10B (FIG. 11) respectively. The data input and the set input of flip-flop U10A and U10B are connected to +5 Volts. The clock input of flip-flop U10A is connected to the KREQIN signal, and the clock input of flip-flop U10B is connected to the REQIN signal. The clear input of flip-flop U10A is connected to the clear interrupt request signal (CLRIRQ) on output pin 10 of microprocessor U30. Similarly, the clear input of flip-flop U10B is connected to the clear data channel (CLRDCH) output on pin 14 of microprocessor U30.

In operation, when a keystroke is transmitted form the keyboard, a KREQIN signal transistion on the CLKIN of flip-flop U10A will cause that flip-flop to go to a set condition, providing a KBIRQ interrupt signal output to pin 13 of microprocessor U30. The microprocessor control program acknowledges the request by inputting the keyboard data bit into the microprocessor and putting out a signal CLRIRQ on pin 10 of microprocessor U30 which resets flip-flop 10A. Similarly, an REQIN signal on the clock input of flip-flop U10B will cause that flip-flop to go to a set condition, which provides an IBMIRQ signal to interrupt pin 12 of microprocessor U30. The microprocessor control program acknowledges the interrupt by inputting one data bit from the PC and provides a CLRDCH signal on pin 14 of microprocessor U30 which clears the flip-flop U10B.

In such manner, successive bi-directional data bits in the serial transmission between the keyboard and the PC are accumulated inside the microprocessor U30. Successive data bits are accumulated and stored as keystrokes in a line buffer. The operation of the control program of microprocessor U3 on the detected keystrokes is similar to that for the spelling check module utilized in the electronic typewriter, as previously described. For an XT configuration, data is bit serial with ten data bits with clock for each character. For an AT configuration, data is also bit serial with eleven data bits with clock for each character. The microprocessor U30 distinguishes between the XT and AT configuration by the connection of the configuration signal (CONFIG) from connector P2 pin 6 to input pin 11 of microprocessor U30.

The microprocessor U30 thus receives clock and data signals from both the keyboard and from the PC. In order to insure proper operation of the PC and its word processing software, the microprocessor U30 is programmed to echo the clock and data signals received from the keyboard to the PC, and also to echo the clock and data signals received from the PC to the keyboard. The microprocessor U30 listens to the keystroke data and control signals from the keyboard and accumulates successive alphanumeric characters and a line buffer to perform the spelling check function as previously described.

The spelling check module for use with a PC is provided with special flexible environment functions keys as shown in FIG. 3. Initially, the system is programmed to respond to particular default settings for control of the program. For example, to turn on the spelling check module, the key <CTRL>]key and the number zero key are pressed. To add a word to the personal dictionary of the spelling check module, the <CTRL> key also and the number 1 is pressed.

To remove a word from the personal dictionary of the spelling check module, the <CTRL> key and the number 2 key are pressed. These function keys correspond to the special function keys for on/off, add, and delete keys used in the flow chart of FIG. 5 at steps 70, 58 and 54.

Since each different word processor software product uses different control keys for various editing functions, the spelling check module of the present invention has the ability to flexibly program these special function keys. Specifically, the special editing function keys are: (1) Cursor left, (2) Cursor right, (3) Destructive Backspace (a delete that removes the character to the left of the cursor), (4) Delete (a delete that removes the character at the cursor position), (5) Insert On (overwrite off), and (6) Insert Off (overwrite on). As used in the discussion to follow, a mode is defined as the particular set of keys used to perform the foregoing editing functions.

The spelling check module is provided with six preset modes, A through F. For example, to program the editing control keys to that corresponding to WordStar (in which the DELETE key is used for destructive backspace and the <CTRL>G is used for deleting the current character), the operator enters the <CTRL>4 as shown in FIG. 13. Normally, the system is initialized for WordStar (mode A).

The mode setting may be changed to correspond to a different set of editing control keys by pressing the <CTRL> key and one of the numbers 5, 6, 7, 8, or 9 which correspond to the various word processing software programs shown in FIG. 13 corresponding to modes B through F respectively. For example, <CTRL>8 changes the preset for the editing control keys to mode D, which corresponds to the operation of other programs for the IBM PC such as Sidekick or a modified version of WordStar which is herein identified as WordStar 2 (a version in which the {backspace} key is used for backspacing and the (DELETE) key is used for deleting the current character).

The command keys for the spelling check module do not conflict with most word processing software commands. However, the command keys may be changed to eliminate any conflict or to improve convenience of use. The change command keys are given in FIG. 14. Specifically, to change the on/off command to <CTRL>x, the operator types chgoff-@<CTRL>x(SPACE). Thereafter, the command <CTRL>x will turn the spelling check module on and off. Similarly, the chgadd@ command and the chgrem@ command may be used to change the editing control keys for adding or removing words from the personal dictionary. As an example, the add command can be changed to be <CTRL> (Right shift) by entering the command chgadd@<CTRL>(Right shift) (SPACE). When the change commands are used, the text of the change command sequence will appear on the screen and should be deleted after correctly completing the command.

In addition to the modes A through F which change the presets for the editing control keys as described above, there are individual change commands to alter the assignment of the editing control commands to suit any particular word processing program. For example, to change the cursor right key to be <CTRL>D, the operator would type chgrgt@<CTRL>D(SPACE). Similarly, the chglft@ command can be used to change the cursor left key. The delete key and the backspace key may be changed by the use of the chgdel@ command and the chgbsp@ command respectively. The insert on key and the insert off key may be changed by the chgin1@ and the chgin2@ commands respectively.

If necessary, even the designation for control of the modes A through F may be changed to be other than <CTRL>4 through 9 respectively as shown in FIG. 13. To change the mode designation, the chgmox@ command is used, where x represents any of the modes A through F. For example, to change the command key for entering mode A to <ALT>a, the operator types the command chgmoa@<ALT>a(SPACE). Thereafter, the key sequence, <ALT>a will change the spelling check module to mode A. To reset all parameters to the original default condition, the command chgres@(SPACE) is entered.

Thus the spelling check module of the present invention is provided with flexible control commands so that the function of the spelling check module may be tailored to optimally coreside with the host word processor software program in the PC.

Having thus described the invention, what it is desired to claim and thereby protect by Letters Patent is:

1. In an apparatus having a keyboard for generating keystroke data and keystroke control signals, and a data processor for receiving said keystroke data and keystroke control signals, said keyboard having a keyboard connector with a plurality of contacts, and said data processor having a data processor connector with a plurality of contacts, wherein said keyboard connector and said data processor connector are normally interconnected for conducting keystroke data and control signals between the keyboard and the data processor, an improvement comprising:

a spelling check module having first and second connectors interposed between said keyboard connector and said data processor connector, said first connector being connected to said keyboard connector, and said second connector being connected to said data processor connector.

2. A spelling check module in accordance with claim 1 further comprising:

a plurality of connecting means for connecting individual corresponding contacts of said first and second connectors within said module;

register means connected to the connector contacts of said keyboard connector which carry the keystroke data generated by said keyboard, said register means including means for accumulating successive alpha keystroke data;

dictionary means containing a plurality of codes in digital form corresponding to correctly spelled words;

control means responsive to said register means and said plurality of connecting means for detecting a typed word, and responsive to said dictionary means for comparing said detected typed word to the digitally coded contents of said dictionary means and for providing a first output indication corresponding to whether said dictionary means does not contain a digital code corresponding to said detected typed word; and indicator means responsive to said first output indication from said control means for indicating that said detected typed word is misspelled.

3. A spelling check module in accordance with claim 2 further comprising:

means responsive to a first simultaneous combination of two non-printing, non-control keystrokes for deactivating said spelling check module; and means responsive to a second simultaneous combination of two non-printing, non-control keystrokes for reactivating said spelling check module.

4. A spelling check module in accordance with claim 3, wherein said keyboard further includes user definable keys on the left and the right side of the keyboard face, wherein said first and second combination of non-printing, non-control keystrokes each comprises the combination of said left and right user definable keys.

5. A spelling check module in accordance with claim 2 further comprising:

personal dictionary memory means for storing and retrieving data;

second control means responsive to said register means for storing data in said personal dictionary means representing a correct spelling of a word in said register means;

means responsive to said detected typed word in said register means for comparing said detected typed word to said correct spelling data stored in said personal dictionary memory means and for providing a second output indication corresponding to whether said personal dictionary does not contain a digital code corresponding to said detected typed word; and indicator means responsive to said second output indication from said control means for indicating that said detected typed word is misspelled.

6. A spelling check module in accordance with claim 5 further comprising:

means responsive to simultaneous combination of two non-printing, non-controlling keystrokes for storing said correct spelling of said detected typed word in said personal dictionary memory means.

7. A spelling check module in accordance with claim 6, wherein said simultaneous combination of two non-printing, non-control keystrokes comprises one of said user definable keys and a shift key.

8. A spelling check module in accordance with claim 1 further comprising:

control means connected to said plurality of contacts of said keyboard connector for transferring received signals to said plurality of contacts of said data processor connector;

said control means also connected to said plurality of contacts of said data processor connector for transferring received signals to said plurality of contacts of said keyboard connector;

said control means further including register means connected to said plurality of conductors of said keyboard connector, wherein said plurality of conductors of said keyboard connector conduct signals representing successive keystroke data in digital form, said register means including means for accumulating successive alphanumeric keystroke data;

dictionary means containing a plurality of codes in digital form corresponding to correctly spelled words;

said control means further includes means responsive to said register means and said plurality of connecting means for detecting a typed word, and responsive to said dictionary means for comparing said detected typed word to the digitally coded contents of said dictionary means and for providing a first output indication corresponding to whether said dictionary means does not contain a digital code corresponding to said detected typed word; and indicator means responsive to said first output indication from said control means for indicating that said detected typed word is misspelled.

9. A spelling check module in accordance with claim 8 further comprising:

means responsive to a first simultaneous combination of two non-printing, non-control keystrokes for deactivating said spelling check module; and means responsive to a second simultaneous combination of two non-printing, non-control keystrokes for reactivating said spelling check module.

10. A spelling check module in accordance with claim 9, wherein said first and second combination of non-printing, non-control keystrokes each comprises the combination of the control key and numeric zero key.

11. A spelling check module in accordance with claim 8 further comprising:

personal dictionary memory means for storing and retrieving certain data;

said control means further responsive to said register means for storing certain data in said personal dictionary means representing a correct spelling of a word in said register means; when said control means is commanded to store said certain data;

means responsive to said detected typed word in said register means for comparing said detected typed word to said correct spelling data stored in said personal dictionary memory means and for providing a second output indication corresponding to whether said dictionary does not contain a digital code corresponding to said detected typed word; and indicator means responsive to said second output indication from said control means for indicating that said detected typed word is misspelled.

12. A spelling check module in accordance with claim 11 wherein said control means is responsive to a simultaneous combination of two non-printing, non-control keystrokes for storing and correct spelling of said detected typed word in said personal dictionary memory means.

13. A spelling check module in accordance with claim 12, wherein said simultaneous combination of two non-printing, non-control keystrokes comprises a control key and a numeric key other than zero.

14. A spelling check apparatus in accordance with claim 9 further comprising:

means responsive to a first change command entered at said keyboard for altering the designation of said first and second simultaneous combination of two non-printing, non-control keystrokes for activating and deactivating said spelling check module.

15. A spelling check module in accordance with claim 12 further comprising:

means responsive to a second change command entered at said keyboard for altering the designation of said simultaneous combination of two non-printing, non-control keystrokes for storing said correct spelling of said detected typed word in said personal dictionary means.

* * * * *